US008743825B2

(12) United States Patent
Sebire et al.

(10) Patent No.: US 8,743,825 B2
(45) Date of Patent: Jun. 3, 2014

(54) HANDOVERS IN A COMMUNICATION SYSTEM

(75) Inventors: Benoist Sebire, Tokyo (JP); Juho Pirskanen, Tampere (FI); Mikko J. Rinne, Espoo (FI)

(73) Assignee: Nokia Corporation, Espoo (FI)

( * ) Notice: Subject to any disclaimer, the term of this patent is extended or adjusted under 35 U.S.C. 154(b) by 701 days.

(21) Appl. No.: 11/465,214

(22) Filed: Aug. 17, 2006

(65) Prior Publication Data

US 2008/0043672 A1 Feb. 21, 2008

(51) Int. Cl.
*H04W 4/00* (2009.01)
*H04B 7/216* (2006.01)
*H04W 36/00* (2009.01)
*H04W 24/00* (2009.01)
*H04W 72/00* (2009.01)

(52) U.S. Cl.
USPC ........... 370/331; 455/436; 455/437; 455/440; 455/456.1; 455/452.2; 370/313; 370/335

(58) Field of Classification Search
USPC ........................................ 370/331
See application file for complete search history.

(56) References Cited

U.S. PATENT DOCUMENTS 5,822,696 A * 10/1998 Bergkvist ................ 455/436
7,466,981 B1 * 12/2008 Abdelhamid et al. ........ 455/438
2002/0167965 A1 11/2002 Beasley et al.
2003/0148774 A1 * 8/2003 Naghian et al. ............. 455/456
2003/0207687 A1 11/2003 Svedevall et al.
2004/0077350 A1 * 4/2004 Naghian ..................... 455/440
2005/0128969 A1 6/2005 Lee et al.
2005/0239466 A1 * 10/2005 Calin et al. .................. 455/437
2006/0133323 A1 * 6/2006 Obuchi et al. ................ 370/335
2007/0230399 A1 * 10/2007 Oswal et al. ................ 370/331
2007/0298811 A1 * 12/2007 Hartman et al. .......... 455/452.2

FOREIGN PATENT DOCUMENTS

KR 2005-0057704 A 6/2005

OTHER PUBLICATIONS

PCT International Search Report and Written Opinion, PCT/IB2007/002146, filed Jul. 20, 2007.
3GPP, 3GPP TR 25.813, Technical Report, Jun. 2006, pp. 1-39, vol. 7.0.0, Release 7, 3rd Generation Partnership Project (3GPP).
3GPP, 3GPP TR 25.913, Technical Report, Mar. 2006, pp. 1-18, vol. 7.3.0, Release 7, 3rd Generation Partnership Project (3GPP).
Office Action from related Korean Patent Appl. No. 2009-7005359, dated Sep. 30, 2010.
Office Action for Chinese Application No. 200780030402.4 dated Jul. 29, 2011.

* cited by examiner

*Primary Examiner* — Timothy Pham
(74) *Attorney, Agent, or Firm* — Alston & Bird LLP

(57) ABSTRACT

A method for handover is disclosed. The method comprises generation of mobility information that associates with a mobile device attached to a first access node. The mobility information is then communicated to a second access node for use in a handover of the mobile device from the first access node to the second access node.

33 Claims, 3 Drawing Sheets

HANDOVERS IN A COMMUNICATION SYSTEM

BACKGROUND OF THE INVENTION

1. Field of the Invention

Embodiments of the present invention relates to a communication system, and in particular to handover of a mobile device between at least two access nodes.

2. Description of Related Art

A communication device can be understood as a device provided with appropriate communication and control capabilities for enabling use thereof for communication with others parties. The communication may comprise, for example, communication of voice, electronic mail (email), text messages, data, multimedia and so on. A communication device typically enables a user of the device to receive and transmit communication via a communication system and can thus be used for accessing various applications.

A communication system is a facility which facilitates the communication between two or more entities such as the communication devices, network entities and other nodes. A communication system may be provided by one more interconnect networks. One or more gateway nodes may be provided for interconnecting various networks of the system. For example, a gateway node is typically provided between an access network and other communication networks, for example a core network and/or a data network.

An appropriate access system allows the communication device to access to the wider communication system. An access to the wider communications system may be provided by means of a fixed line or wireless communication interface, or a combination of these. Communication systems providing wireless access typically enable at least some mobility for the users thereof. Examples of these include wireless communications systems where the access is provided by means of an arrangement of cellular access networks. Other examples of wireless access technologies include different wireless local area networks (WLANs) and satellite based communication systems.

A wireless access system typically operates in accordance with a wireless standard and/or with a set of specifications which set out what the various elements of the system are permitted to do and how that should be achieved. For example, the standard or specification may define if the user, or more precisely user equipment, is provided with a circuit switched bearer or a packet switched bearer, or both. Communication protocols and/or parameters which should be used for the connection are also typically defined. For example, the manner in which communication should be implemented between the user equipment and the elements of the networks and their functions and responsibilities are typically defined by a predefined communication protocol.

In the cellular systems a network entity in the form of a base station provides a node for communication with mobile devices in one or more cells or sectors. It is noted that in certain systems a base station is called 'Node B'. When a mobile device moves from a base station to another base station, handover techniques are used to ensure that the communication is not lost as a consequence of the move. There are many different techniques for processing signals for transmission between the base station and the user equipment, and the precise handover technique which is used depends on the access system.

Typically the operation of a base station apparatus and other apparatus of an access system required for the communication is controlled by a particular control entity. The control entity is typically interconnected with other control entities of the particular communication network. Handover management is typically provided by an appropriate handover control entity of the cellular communication system. The handover controller typically provides a centralised control of handovers in a radio access network so as to appropriately control the handover in different cells of the access network. For example, a radio network controller (RNC) centrally manages handovers in Universal Terrestrial Radio Access Networks (UTRAN) and a base station controller (BSC) manages the handovers in GSM (Global System for Mobile) EDGE (Enhanced Data for GSM Evolution) Radio Access Networks (GERAN).

However, it has been proposed that various control functions that have been typically handled by a centralised controller can also be handled in a distributed manner. This kind of distributed architecture is sometimes referred to as a "flat architecture". In view of handover management this means that there is no central node in a radio access network, but the handover control is distributed to be taken care of by a base station and associated local control functions thereof.

A non-limiting example of such architectures is a concept known as the Evolved Universal Terrestrial Radio Access (E-UTRA). An Evolved Universal Terrestrial Radio Access Network (E-UTRAN) consists of E-UTRAN Node Bs (eNBs) which are configured to provide base station and control functionalities of the radio access network. The eNBs may provide E-UTRA features such as user plane radio link control/medium access control/physical layer protocol (RLC/MAC/PHY) and control plane radio resource control (RRC) protocol terminations towards the mobile devices. The eNBs interface to an E-UTRAN access gateway (aGW) via a so called S1 interface, and are inter-connected via a so called X2 interface.

However, a flat architecture provides no central management entity for managing handovers. This means that some information that would be available in a central node such as the UTRAN RNC or GERAN BSC may disappear when the mobile device moves from one E-UTRA access node to another. This may result inefficiencies in the mobility and radio resource management. In extreme cases lack of this information may even result lost data and failed handovers.

SUMMARY

In accordance with an embodiment there is provided a method wherein mobility information associated with a mobile device attached to a first access node is generated. The mobility information is then communicated to a second access node for use in a handover of the mobile device from the first access node to the second access node.

In accordance with another embodiment there is provided a method wherein mobility information is received at a target base station from at least one of a source base station and a mobile device, the information being associated with the mobile device. The information is then used in managing a handover of the mobile device to the target base station.

In accordance with a further embodiment there is provided an apparatus comprising an interface for receiving mobility information associated with a mobile device. The apparatus further comprises a controller configured to utilise the mobility information in a handover thereto of the mobile device from an access node.

In accordance with another embodiment there is provided an apparatus comprising a controller configured to generate mobility information in association with a mobile device. The apparatus further comprises an interface for communicating the mobility information to an access node for use in a handover of the mobile device to the access node.

In accordance with a yet further embodiment there is provided a system comprising a first access node and a controller configured to generate mobility information associated with a mobile device attached to the first access node. The system also comprises a second access node. An interface for communication of the mobility information to the second access node is provided, the second access node being configured to utilise the information in a handover of the mobile device thereto from the first access node.

In accordance with a more specific embodiment the mobility information is utilised in handing a mobile device from an access node to another. Thus may comprise optimisation of resource management at other access node. One of a macrocell, a microcell and a picocell may be selected based on the mobility information.

The mobility information may comprise information regarding at least one of the frequency of handovers, the number of handovers, the time of at least one previous handover, the time of entrance of the mobile device into the first access node, the size of a service area associated with the first access node, and an identity associated with the first access node.

BRIEF DESCRIPTIONS OF THE DRAWINGS

For a better understanding of the present invention and how the same may be carried into effect, reference will now be made by way of example only to the accompanying drawings in which.

DESCRIPTION OF EXEMPLIFYING EMBODIMENTS

Figure 1:
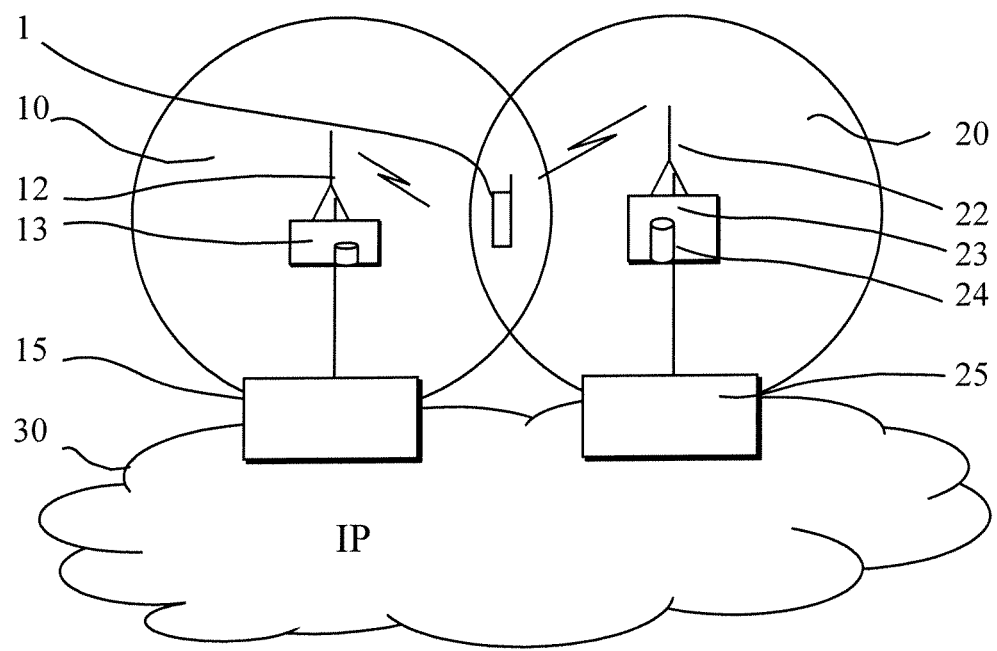
FIG. 1 shows a schematic presentation of two wireless access systems a mobile device may use for accessing a data network.

Before explaining in detail certain exemplifying embodiments, certain general principles of wirelessly accessing a communication system are briefly explained with reference to FIGS. 1 and 2.

A communication device can be used for accessing various services and/or applications provided via a communications system. In wireless or mobile systems the access is provided via an access interface between a mobile device 1 and an appropriate wireless access system 10 and 20.

A mobile device 1 can typically access wirelessly a communication system via at least one base station 12 and 22 or similar wireless transmitter and/or receiver node. Non-limiting examples of appropriate access nodes are a base station of a cellular system and a base station of a wireless local area network (WLAN). Each mobile device may have one or more radio channels open at the same time and may be connected to more than one base station.

A base station is typically controlled by at least one appropriate controller entity 13, 23 so as to enable operation thereof and management of mobile devices in communication with the base station. The controller entity is typically provided with memory capacity and at least one data processor.

A mobile device may be used for accessing various applications. For example, a mobile device may access applications provided in a data network 30. For example, various applications may be offered in a data network that is based on the Internet Protocol (IP) or any other appropriate protocol.

In FIG. 1 the base station nodes 12 and 22 are connected to the data network 30 via appropriate gateways 15 and 25 respectively. A gateway function between a base station node and another network may be provided by means of any appropriate gateway node, for example a packet data gateway and/or an access gateway.

Figure 2:
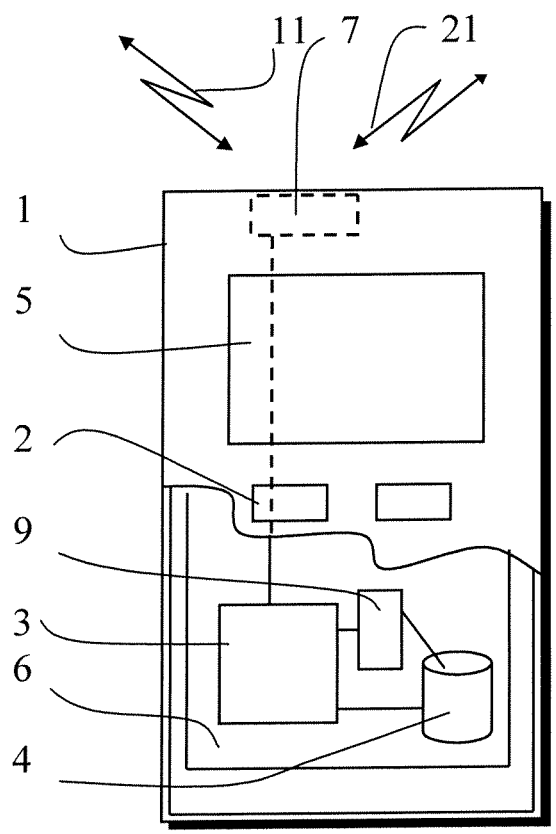
FIG. 2 shows a partially sectioned view of a mobile device.

FIG. 2 shows a schematic partially sectioned view of a mobile device 1 that can be used for accessing a communication system via a wireless interface. The mobile device 1 of FIG. 1 can be used for various tasks such as making and receiving phone calls, for receiving and sending data from and to a data network and for experiencing, for example, multimedia or other content.

An appropriate device may be provided by any device capable of at least sending or receiving radio signals. Non-limiting examples include a mobile station (MS), a portable computer provided with a wireless interface card or other wireless interface facility, personal data assistant (PDA) provided with wireless communication capabilities, or any combinations of these or the like. The mobile device 1 may communicate via an appropriate radio interface arrangement of the mobile device. In FIG. 1 the radio interface arrangement is designated schematically by block 7. The interface arrangement may be provided for example by means of a radio part and associated antenna arrangement. The antenna arrangement may be arranged internally or externally to the mobile device.

A mobile device is typically provided with at least one data processing entity 3 and at least one memory 4 for use in tasks it is designed to perform. The data processing and storage entities can be provided on an appropriate circuit board and/or in chipsets. This feature is denoted by reference 6.

The user may control the operation of the mobile device by means of a suitable user interface such as key pad 2, voice commands, touch sensitive screen or pad, combinations thereof or the like. A display 5, a speaker and a microphone are also typically provided. Furthermore, a mobile device may comprise appropriate connectors (either wired or wireless) to other devices and/or for connecting external accessories, for example hands-free equipment, thereto.

The mobile device 1 may be enabled to communicate with a number of access nodes, for example when it is located in the coverage areas of the two base stations 12 and 22 of FIG. 1. This capability is illustrated in FIG. 2 by the two wireless interfaces 11 and 21.

The mobile device 1 can be handed over from one access node such as a base station to another access node. In accordance with an embodiment at least some information regarding mobility of a mobile device is transferred to the target access node, for example from a source access node, during handover. The information may be transferred over any appropriate interface. A non-limiting example of an appropriate interface arrangement is an X2 interface between two eNBs.

The mobility information is useful for the purposes of optimising mobility management and radio resource handling. The new access node may use the information indicative of, for example, handover frequency of a particular mobile device for determining how fast the mobile device is moving. For example, within a pool of available radio resources, for example physical resource blocks, some of the resources may be more appropriate for fast moving mobile devices than others. Such resources should therefore be optimally allocated to a fast moving mobile device as a priority.

The algorithm for detection of the speed and for performing subsequent actions such as selection of the channel parameters and control of the connection set-up and so forth can be provided in various manners. For example, a processor may be configured to estimate the speed from the number of handovers during a period of time.

Figure 3:
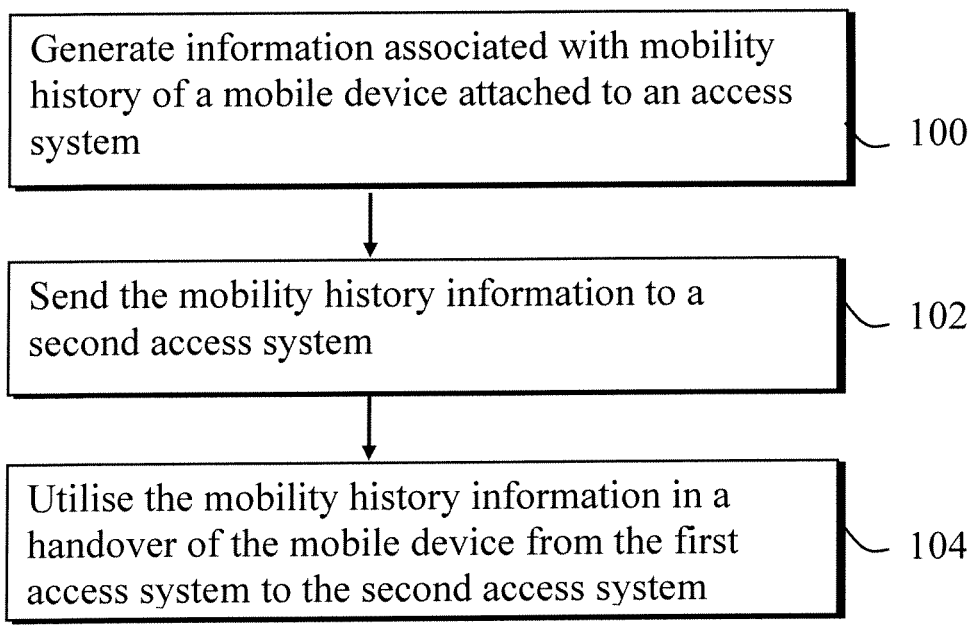
FIG. 3 is a flowchart in accordance with an embodiment.

An embodiment is illustrated by the flowchart of FIG. 3. In this example information regarding recent mobility of a mobile device is generated at 100. The generation may occur, for example, in a controller of the serving i.e. the old access node and/or a controller of the mobile device.

The mobility information may comprise information indicative of the manner the mobile device has moved and/or the speed and/or direction of movement thereof. The mobility information may relate only to relatively recent events. In the other extreme, even relatively long periods may be covered, for example to enable analysis of everyday movement patterns of a mobile user. The information may also cover other information from previous access systems visited earlier by the mobile device.

The mobility information communicated to the new access node may comprise information such as the number of handovers since the mobile device entered a radio resource control (RRC) 'connected' state and the time elapsed since then and/or a parameter indicative of the frequency of the handovers. According to a possibility a timestamp of the last handover is passed to a new access node. It is also possible to pass information about the time when the mobile device entered the source access node, and/or previous access nodes. If differently sized access node coverage areas such as differently sized radio cells are provided, see the example of FIG. 5, a parameter indicative of the size of a source cell may also be transferred. According to a possibility a cell identity (cell id) is passed between source and target access nodes.

It is noted that the above are only examples of the mobility information that may be communicated to a target or new access node. Thus the information may contain in a combination one or more of the above mentioned examples, and/or any other information that can be used for determining mobility history of a mobile device to be transferred to a target access node at 102.

The mobility information can be used by the target access node at 104 in various manners. For example, a radio resource management (RRM) algorithm of a radio resource management controller may determine the speed and/or direction in which the mobile device is moving. This information can then be used, for example, to determine how to optimise allocation of resources.

For example, a mobile device may be provided with a different type of service depending its allocated speed class, such as based on a rough classification of speed into categories 'slow' and 'fast'. A controller of the new access node can then determine based on the mobility information if the mobile device is moving 'fast' or 'slow'. The handover and resource allocation may then be processed accordingly, as it may be important for the optimal operation of the system that a proper set-up is used from the beginning for a connection handed over to a new access node.

To illustrate the speed based classification further, consider an example where a radio access network is designed to operate in an optimal manner for low mobile speeds from 0 to 15 km/h. Higher mobile speeds between 15 and 120 km/h may require different support with higher performance from the access network. Thus the target base station may decide to set-up the connection, for example the channels and mobility solutions, with the mobile device accordingly.

Mobility across a cellular network may even be maintained at speeds from 120 km/h to 350 km/h, or even up to 500 km/h. It may be required in certain applications that real-time services are supported over the whole of the speed range. In the above example this would mean that a third category, i.e. 'high speed', may be provided for speeds over 120 km/h.

The above method can be embodied in any access system providing wireless access by means of a wireless transceiver node and where mobility history information may be needed for some reason. For example, the access system architecture may be based on that known from the E-UTRA and base on use of the E-UTRAN Node Bs (eNBs). Therefore specific examples for possible signalling mechanisms for enabling passing of information about handover or other mobility related events of a mobile device between access nodes are now described in more detail with reference the E-UTRA and to the signalling flow chart of FIG. 4.

Figure 4:
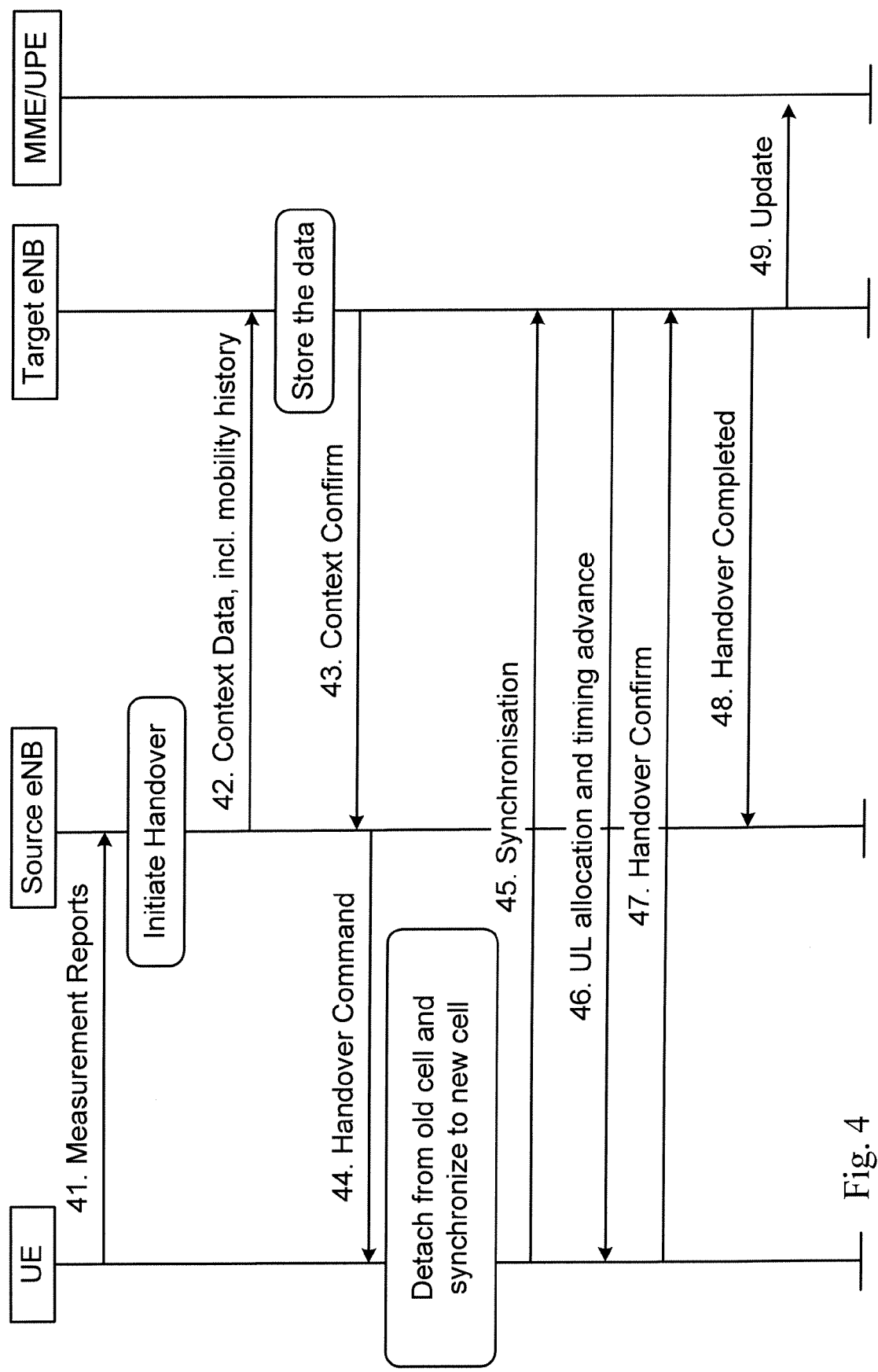
FIG. 4 shows a signalling flow chart in accordance with a specific embodiment.

To assist in understanding the below described embodiments, a brief description of some of the messages associated with a handover in accordance with the E-UTRA is given first. More particularly, the exemplifying handover signalling sequence of FIG. 4 is based on the handover procedure as shown in FIG. 9.1.5 of the third generation partnership project (3GPP) TR 25.813, V7.0.0(2006-06) 'Evolved UTRA and UTRAN—Radio interface protocol aspects'. It is noted that not all of the shown messages may be needed for carrying any information that directly associated with the embodiments.

As shown, a mobile device (UE) may send measurement reports 41 to a serving base station, referred to as Source eNB (E-UTRAN Node B) in FIG. 4. The serving base station may then make a decision based on a measurement report and other information, for example radio resource management information, to hand off the mobile device to another i.e. target base station (Target eNB in FIG. 4). The base station prepares the target base station for handover by sending a request for handover, see message 42. The message may contain information relevant to the proposed handover and include also an information element regarding the mobility history of the mobile device. This data may then be stored, at least temporarily, in the target base station. Alternatively, the mobility information is used immediately.

The target base station may now start preparing for the handover and respond to source base station providing any required parameters in message 43. After reception of an acceptance of the handover from the target base station, the source base station may start forwarding data packets to the target base station.

The mobile device may also be sent a handover command message 44, preferably with necessary parameters. The mobile device may then initiate an appropriate synchronization process to the target base station by sending message 45. The target base station may respond by message 46 including parameters such as uplink allocation and timing advance. These are then used by the mobile device to send a handover confirm message 47 to the target base station. This message typically completes the handover procedure for the mobile device.

The target base station may then inform of a successful handover to the source base station by message 48. The latter may then clear already forwarded data from its buffers. The location information of the mobile device may be updated by message 49 in a mobility management entity (MME/UPE) in order to enable forwarding of data packets directly to the new i.e. target base station.

In the above embodiment the source base station includes information regarding the mobility of the mobile device in message 42. This, however, is not the only possibility. For example, the mobile device may generate the mobility information and send it directly to the target base station. For example, the mobile device may include the information into the handover confirmation message 47.

In this regard a reference can also be made to FIG. 2 showing a second data processing entity 9 of the mobile adapted for performing data processing in accordance with this embodiment. More particularly, the data processing entity 9 of the mobile device 1 may be configured to generate mobility information based on handover and other information. Processor 9 or alternatively controller 3 may control the inclusion of this information into messages send to an access node.

In accordance with an embodiment an estimation of the speed of a mobile device is provided based on additional information regarding a previous cell and/or a number of previous cells visited by the mobile device. For example, information passed from a source base station to a target base station may include a parameter that is indicative of the size of the previous cell.

Figure 5:
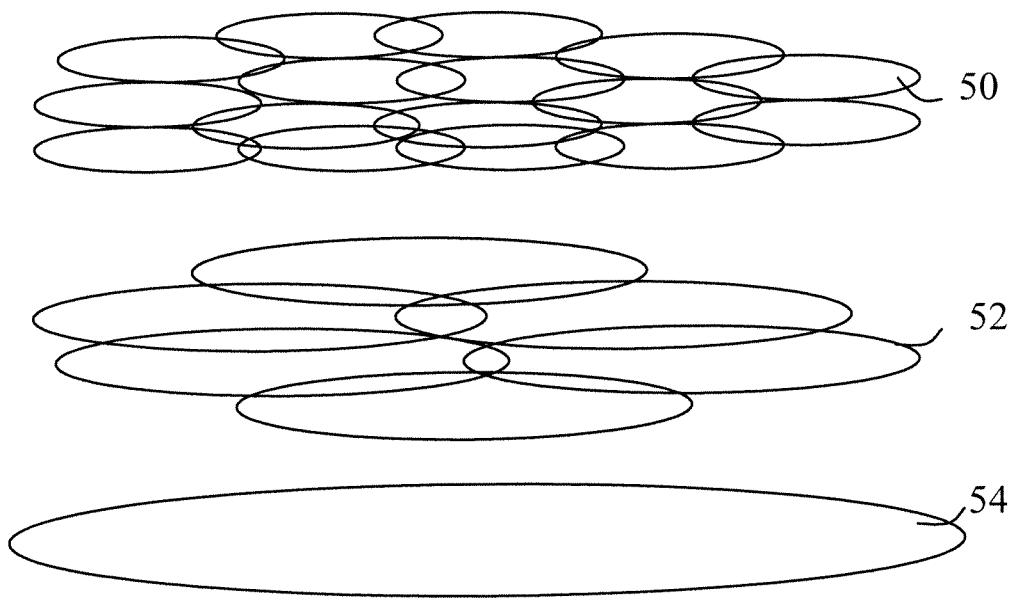
FIG. 5 illustrates different cells sizes in an area.

This may be particularly useful in radio access coverage areas such as that shown in FIG. 5. More particularly, FIG. 5 shows a schematic presentation of an area covered by three types of cells, namely a macrocell 54, microcells 52 and picocells 50. Each of these cells may serve a mobile device. An appropriate cell may be selected based on the speed of the mobile device and/or other mobility information. The mobility information may be a measure of distance, for example in meters, or a cell type designation associated with the cell size, for example one of a macrocell, a microcell and a picocell, or any other appropriate parameter.

The mobility information passed between base stations may be a sliding average of the values that is updated at each handover. The sliding averaging is also sometimes called a "leaky bucket". The update may be provided with a specified ratio of change. For example, a weight of the old average compared to new value. According to a possibility only a limited number of previous values can be passed as a table, list or in another predefined format.

If the mobility information passed to the new access node is in the form of entries in a table and the measure of distance applied is something like a cell type, a possible implementation is a system, where the change in the cell type (for example between macrocell, microcell and picocell) resets the table values. This may need to be done because the handover rates measured on one cell layer (e.g. macrocell 54 of FIG. 5) may not be comparable with values measured on another cell layer (e.g. microcell 52).

In accordance with a further embodiment a cell identity (id) is transferred between base stations at handover. The cell id information may then be used to detect if the mobile device is performing "ping-pong" handovers between the cells. In this case any estimate of the speed of the mobile device may not always be useful as such. However, the measured rate of handover can still be used as an indication that another cell layer might be more suitable for the mobile device in order to avoid continuous handovers on the cell border.

The required data processing functions may be provided by means of one or more data processors. All data processing may be provided in a central processing unit of an access system, or distributed across several data processing modules. The above described data processing functions of a mobile device may also be provided by separate processors, see for example entities 3 and 9 of FIG. 2, or by an integrated processor. An appropriately adapted computer program code product or products may be used for implementing the embodiments, when loaded on an appropriate processor, for example in a processor of the mobile device and/or an access system controller. The program code means may, for example, perform the generation of the mobility history information, control transportation thereof, determination of speed and/or direction and other characteristic mobility feature of the mobile device, determine the suitability of an interface, selection, generation of messages and/or information elements, interpretation of information and so forth. The program code product for providing the operation may be stored on and provided by means of a carrier medium such as a carrier disc, card or tape. A possibility is to download the program code product to the mobile device via a data network.

The embodiment may be advantageous in that the target access node is provided with information regarding the mobility of a mobile device even when it cannot have this information from a central controller. The target access node may then utilise the information in managing a handover from a previous access node in an optimised manner. The embodiments may in certain situations reduce the risk of failed or inappropriate handovers and/or loss of data.

It is noted that whilst embodiments have been described in relation to mobile devices such as mobile terminals, embodiments of the present invention are applicable to any other suitable type of apparatus suitable for communication via a multiple of access nodes wherein a communication device can be handed over from a communication interface to another communication interface. The wireless interfaces may even be based on different access technologies. A mobile device may be configured to enable use of different access technologies, for example, based on an appropriate multi-radio implementation.

It is also noted that although certain embodiments were described above by way of example with reference to the exemplifying architectures of certain cellular networks and a wireless local area network, embodiments may be applied to any other suitable forms of communication systems than those illustrated and described herein. It is also noted that the term access interface is understood to refer to any interface an apparatus configured for wireless communication may use for accessing applications.

It is also noted herein that while the above describes exemplifying embodiments of the invention, there are several variations and modifications which may be made to the disclosed solution without departing from the scope of the present invention as defined in the appended claims.

We claim:

1. A method comprising:
   generating mobility information associated with a mobile device attached to a first access node, the mobility information comprising information regarding a frequency of handovers, a number of handovers, a time of at least one previous handover, a time of entrance of the mobile device into the first access node, and a size of a service area associated with the first access node; and
   causing communication of the mobility information to a second access node for use in a handover of the mobile device from the first access node to the second access node.

2. The method as claimed in claim 1, comprising managing the handover from the first access node based on the mobility information.

3. The method as claimed in claim 2, comprising optimizing resource management at the second access node based on the mobility information.

4. The method as claimed in claim 2, comprising determining a service class to be offered to the mobile device based on the mobility information.

5. The method as claimed in claim 4, comprising determining the service class based on the speed of the mobile device.

6. The method as claimed in claim 2, comprising selecting channel parameters based on the mobility information.

7. The method as claimed in claim 2, comprising managing connection set-up based on the mobility information.

8. The method as claimed in claim 1, comprising selecting one of a macrocell, a microcell and a picocell based on the mobility information.

9. The method as claimed in claim 1, wherein the generating comprises generating at least a part of the mobility information at the first access node.

10. The method as claimed in claim 9, wherein the causing communication comprises causing communication of the mobility information from the first access node to the second access node.

11. The method as claimed in claim 1, wherein the generating comprises generating at least a part of the mobility information at the mobile device.

12. The method as claimed in claim 11, wherein the causing communication comprises causing communication of the mobility information from the mobile device to the second access node.

13. The method as claimed in claim 1, wherein the causing communication comprises sending the mobility information from an Evolved Universal Terrestrial Radio Access Network Node B to another Evolved Universal Terrestrial Radio Access Network Node B.

14. The method as claimed in claim 1, comprising determining at least one parameter selected from the group consisting of the speed and direction of movement of the mobile device.

15. The method as claimed in claim 1, wherein the causing communication comprises sending the mobility information in at least one communication selected from the group consisting of a request for a handover and a message confirming a handover.

16. The method as claimed in claim 1, wherein the generation comprises averaging of mobility information in response to a handover.

17. The method as claimed in claim 16, wherein the averaging of mobility information comprises weighted averaging.

18. The method as claimed in claim 1, wherein the generation comprises generation of table entries of mobility information parameters.

19. The method as claimed in claim 18, comprising resetting the table entries in response to a predefined event.

20. A method comprising:
receiving in a target base station mobility information associated with a mobile device from at least one source selected from the group consisting of a source base station and the mobile device, the mobility information comprising information regarding a frequency of handovers, a number of handovers, a time of at least one previous handover, a time of entrance of the mobile device into a first access node, and the size of a service area associated with the first access node; and
using the information in managing a handover of the mobile device to the target base station.

21. The method as claimed in claim 20, wherein managing of the handover based on the mobility information comprises at least one operation selected from the group consisting of optimising resource management, determining a service class to be offered to the mobile device, selecting channel parameters, managing connection set-up, selecting one of a macrocell, a microcell and a picocell, and prevent the handover.

22. The method as claimed in claim 20, wherein the target base station comprises an Evolved Universal Terrestrial Radio Access Network Node B.

23. A computer program product comprising:
at least one non-transitory computer-readable medium having program code stored thereon, the program code which when executed by an apparatus cause the apparatus at least to:
generate mobility information associated with a mobile device that is attached to a first access node, the mobility information comprising information regarding a frequency of handovers, a number of handovers, a time of at least one previous handover, a time of entrance of the mobile device into the first access node, and a size of a service area associated with the first access node; and
cause communication of the mobility information to a second access node for use in processing a handover by the second access node.

24. The computer program as claimed in claim 23, further comprising program code instructions being configured to control generation and communication of information regarding the frequency of handovers, the number of handovers, the time of at least one previous handover, the time of entrance of the mobile device into the first access node, the size of a service area associated with the first access node, and an identity associated with the first access node.

25. A computer program product comprising:
at least one computer readable non-transitory memory medium having program code stored thereon, the program code which when executed by an apparatus cause the apparatus at least to:
analyze information associated with mobility history of a mobile device as received from at least one source selected from the group consisting of a first access node and the mobile device, the mobility information comprising information regarding a frequency of handovers, a number of handovers, a time of at least one previous handover, a time of entrance of the mobile device into the first access node, and a size of a service area associated with the first access node; and
utilize the information in managing a handover of the mobile device from the access node.

26. The computer program as claimed in claim 25, further comprising program code instructions configured to provide, based on the mobility information, at least one function selected from the group consisting of optimization of resource management, determination of a service class to be offered to the mobile device, selection of at least one channel parameter, connection set-up management, selection of an appropriate cell and prevention of the handover.

27. An apparatus comprising:
a processor, and
a memory including computer program code, the memory and the computer program code configured to, with the processor, cause the apparatus at least to: generate mobility information in association with a mobile device, the mobility information comprising information regarding a frequency of handovers, a number of handovers, a time of at least one previous handover, a time of entrance of the mobile device into an access node, and the size of a service area associated with the access node; and
direct communication of the mobility information to an another access node for use in a handover of the mobile device to the another access node.

28. The apparatus as claimed in claim 27, selected from the group consisting of a source base station and the mobile device.

29. The apparatus as claimed in claim 27, comprising an Evolved Universal Terrestrial Radio Access Network Node B.

30. An apparatus comprising:
- an interface for receiving mobility information associated with a mobile device, the mobility information comprising information regarding a frequency of handovers, a number of handovers, a time of at least one previous handover, a time of entrance of the mobile device into an access node, and the size of a service area associated with the access node; and
- a controller configured to utilize the mobility information in a handover thereto of the mobile device from the access node to another access node.

31. The apparatus as claimed in claim 30, comprising an Evolved Universal Terrestrial Radio Access Network Node B.

32. A system comprising:
- a first access node;
- a controller configured to generate mobility information associated with a mobile device attached to the first access node, the mobility information comprising information regarding a frequency of handovers, a number of handovers, a time of at least one previous handover, a time of entrance of the mobile device into the first access node. and a size of a service area associated with the first access node;
- a second access node; and
- an interface for communication of the mobility information to the second access node, wherein the second access node is configured to utilize the information in a handover of the mobile device thereto from the first access node.

33. The system as claimed in claim 32, wherein at least the second access node comprises a base station of an Evolved Universal Terrestrial Radio Access Network.

* * * * *

UNITED STATES PATENT AND TRADEMARK OFFICE
CERTIFICATE OF CORRECTION

| | |
|---|---|
| PATENT NO. | : 8,743,825 B2 |
| APPLICATION NO. | : 11/465214 |
| DATED | : June 3, 2014 |
| INVENTOR(S) | : Sebire et al. |

It is certified that error appears in the above-identified patent and that said Letters Patent is hereby corrected as shown below:

In the claims:

Column 10,
Line 22, Claim 24, "instructions being configured" should read --instructions configured--.
Line 65 and 66, Claim 27, "an-another" should read --another--.

Signed and Sealed this
Seventh Day of October, 2014

Michelle K. Lee
*Deputy Director of the United States Patent and Trademark Office*